United States Patent
Spaulding et al.

(10) Patent No.: US 6,852,254 B2
(45) Date of Patent: Feb. 8, 2005

(54) METHODS FOR THE PRODUCTION OF TINTED CONTACT LENSES

(75) Inventors: Terry L. Spaulding, Jacksonville, FL (US); Keith B. Herrin, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 405 days.

(21) Appl. No.: 10/180,587

(22) Filed: Jun. 26, 2002

(65) Prior Publication Data

US 2004/0000732 A1 Jan. 1, 2004

(51) Int. Cl.⁷ .............................................. B29D 11/00
(52) U.S. Cl. ........................ 264/1.36; 264/1.7; 264/492
(58) Field of Search ........................ 264/1.1, 1.7, 1.36, 264/1.38, 2.6, 492; 425/808; 351/159, 162, 163

(56) References Cited

U.S. PATENT DOCUMENTS

| | | | |
|---|---|---|---|
| 4,640,805 A | * | 2/1987 | Neefe ........................ 264/1.1 |
| 5,034,166 A | * | 7/1991 | Rawlings et al. ............ 264/1.7 |
| 8,068,797 | | 5/2000 | Hunt |
| 6,284,161 B1 | * | 9/2001 | Thakrar et al. ............... 264/1.7 |

FOREIGN PATENT DOCUMENTS

| | | |
|---|---|---|
| EP | 0 983 837 A2 | 3/2000 |
| WO | WO 96/34735 A1 | 11/1996 |

OTHER PUBLICATIONS

PCT International Search Report, dated Nov. 13, 2003, for PCT Int'l. Appln. No. PCT/US03/18797.

* cited by examiner

*Primary Examiner*—Mathieu D. Vargot
(74) *Attorney, Agent, or Firm*—Lois Gianneschi

(57) ABSTRACT

The invention provides a method for producing tinted contact lenses in which diffusion of monomer into the colorant is aided by heating of the molds. The invention provides a method, and lenses produced by that method, that reduces the residual, unbound polymer on the lens surface and lens surface roughness.

24 Claims, No Drawings

— 1 —

METHODS FOR THE PRODUCTION OF TINTED CONTACT LENSES

FIELD OF THE INVENTION

The invention relates to methods useful in the production of tinted contact lenses. In particular, the invention provides a method in which diffusion of monomer into the colorant is aided by the heating of the molds used to produce the lenses.

BACKGROUND OF THE INVENTION

The use of tinted contact lenses to alter the natural color of the iris is well known. Colorants used to produce tinted lenses generally are composed of a binding polymer and pigments. In one method of manufacturing tinted contact lenses, for examples as described and claimed in U.S. application Ser. No. 10/027,579 incorporated in its entirety herein by reference, the colorant is applied to uncured lens material, that is subsequently cured, by transfer of the colorant from a mold surface to the lens material. A disadvantage of this method for producing tinted lenses is that the lens material may not diffuse adequately into the colorant prior to cure. This results in residual, unbound polymer becoming attached to the lens surface during the hydration step of processing of the cured lens.

In order to overcome this disadvantage, it is has been attempted to increase the cure time, thus allowing for a longer period for the diffusion to take place. However, this method is problematic in that it results in an increase in edge defects due to deformation of the lens mold. Thus, a need exits for a method to improve diffusion that does not adversely affect the resulting lens.

DETAILED DESCRIPTION OF THE INVENTION AND PREFERRED EMBODIMENTS

The invention provides a method, and lenses produced by that method, that reduces the residual, unbound polymer on the lens surface and lens surface roughness. In one embodiment, the invention provides a method for manufacturing a contact lens comprising, consisting essentially of, and consisting of the steps of: a.) applying to at least a portion of a molding surface of a mold a tinting-effective amount of a colorant; b.) dispensing a lens-forming amount of a lens material into the mold; c.) heating rapidly the mold to at or above a glass transition temperature of the colorant; d.) diffusing the lens material into the colorant while maintaining the mold temperature at or above a glass transition temperature of the colorant; and e.) curing subsequently the lens material in the mold under conditions suitable to form the tinted contact lens. In another embodiment, the invention provides lenses produced according to this process.

In a first step of the method of the invention, the colorant is applied to the molding surface of a thermoplastic optical mold, made from any suitable material including, without limitation, polypropylene resin, polystyrene resin, and the like and combinations thereof For purposes of the invention, by "molding surface" is meant a mold surface used to form a surface of a lens.

A tinting-effective amount of the colorant is applied to all or a portion of the molding surface of the mold. Typically, the colorant if applied to that portion of the surface that will be used to mold the portion of the lens that will overlay the lens wearer's iris. A "tinting-effective amount" of the colorant is an amount sufficient to impart the desired level of color to the lens to be produced. Generally, about 0.5 mg to about 4.0 mg of colorant is used per lens. The application may be carried out by any convenient means. Preferably, the application is carried out by pad printing.

A lens-forming amount of a lens material then is dispensed into the mold. By "lens-forming amount" is meant an amount sufficient to produce a lens of the size and thickness desired. Typically, about 10 to about 75, preferably about 50 to about 75 mg of lens material is used. By "lens material" is meant the monomer or monomers that, when cured, form the lens. The lens material may include any of a wide variety of additives including, without limitation, initiators, ultraviolet absorbers, and the like and combinations thereof.

The mold is then heated rapidly to facilitate the diffusion of the lens material into the colorant. It is a discovery of the invention that by rapidly heating the mold to a temperature at or above the glass transition temperature ("Tg") of the colorant, diffusion of the lens monomer mixture into the colorant is increased. However, heating must be not be so rapid so as to cause the deformation of the lens molds, which deformation will result in edge defects in the cured lens. Preferably, the mold is heated from about room temperature to the Tg in about 28 seconds, more preferably in about 10 seconds, and most preferably in about 4 seconds. The temperature is then maintained for a period of time prior to the initiation of lens material curing to permit diffusion to take place to the desired degree. Preferably, the diffusion is carried out for a time sufficient to swell the colorant to about 1 to about 4 times its dried thickness. The period of time during which the temperature of the mold is maintained at or above the Tg will depend upon the composition of the colorant and the lens material selected. Preferably, the period of time ranges from about 45 to about 75 seconds, more preferably about 65 to about 75 seconds, and most preferably about 65 to about 71 seconds.

Rapidly heating the mold may be carried out by any convenient method including without limitation, infrared lamps, hot air, or any heating source capable of heating the mold to the desired temperature, but which does not initiate polymerization of the lens material. In a preferred method, a plurality of short wave IR lamps having peak wavelengths of about 1 to about 2 microns are used to rapidly heat the molds. The lamps may be set at specific points along a tunnel through which the mold moves. The mold temperature is maintained while diffusion takes place. Maintenance of the mold temperature at or above the colorant Tg may be carried out by any convenient heating means. In the preferred embodiment, mold temperature is maintained by heating the air surrounding the mold. Thus, in the above-described embodiment, after first rapidly being heated to the colorant Tg, the molds move through a portion of the tunnel in which the air is heated, as for example by heaters.

Subsequent to the diffusion of the lens material into the colorant, the lens material and colorant are cured under conditions suitable to form the tinted lens. The precise conditions for curing will depend upon the components of the colorant and lens material selected and are within the skill of one of ordinary skill in the art to determine. In a preferred embodiment, a visible light cure is used at room air and at an elevated temperature of about 55 to about 70° C. In this embodiment, curing takes from about 75 to about 150 seconds. Once curing is completed, the lens is released from the mold and may be equilibrated in a buffered saline solution.

Typically, the colorant used is composed of one or more pigments, one or more solvents, and a binding polymer. In a preferred embodiment of the invention, a binding polymer is used that is capable of forming an interpenetrating polymer network with the lens material. Thus, in another embodiment, the invention provides a method for manufacturing a contact lens comprising, consisting essentially of, and consisting of the steps of: a.) applying to at least a portion of a molding surface of a mold a tinting-effective amount of a colorant, the colorant comprising, consisting essentially of, and consisting of: one or more pigments, one or more solvents and a binding polymer; b.) dispensing a lens-forming amount of a lens material into the mold; c.) heating rapidly the mold to a temperature that is at or above a glass transition temperature of the colorant; d.) diffusing the lens material into the colorant while maintaining the temperature; and e.) curing subsequently the lens material in the mold under conditions suitable to form the tinted contact lens, wherein the binding polymer and the lens material form an interpenetrating polymer network.

For purposes of the invention, "interpenetrating polymer network" or "IPN" is defined as the combination of two or more independent polymers in which one polymer is synthesized and/or cross-linked in the presence of the other. Thus, some degree of interpenetration occurs within the network structures. Typically, the independent polymers used to form the IPN are in network form. One type of IPN, specifically a semi-IPN, is composed of one or more polymers that are cross-linked and one or more polymers that are not substantially cross-linked as disclosed by "Interpenetrating Polymer Networks: An Overview" by Sperling, L. H. in *Interpenetrating Polymer Networks*, Edited by Klempner, Sperling, and Utracki, pp 3–6(1994). For purposes of the invention, the type of interpenetrating polymer network used is a semi-IPN. In one embodiment, the semi-IPN is formed using a lens material, which is crosslinked and a binding polymer that is not substantially crosslinked. For the purposes of this invention not substantially crosslinked means that the non-crosslinked material is not subjected to conventional crosslinking conditions prior to contact with the lens material. Semi-IPNs may be formed in one step, or in a series of steps, which are known as sequential semi-IPNs. One of ordinarily skilled in the art will recognize that, the presence of cross-linking agents, either through addition or as impurities, can create a reaction environment that favors the formation of a sequential interpenetrating polymer network.

The binding polymers useful in the colorant are made from a homopolymer or copolymer, or combinations thereof, having similar solubility parameters to each other and the binding polymer has similar solubility parameters to the lens material. These binding polymers may contain functional groups that render the polymers and copolymers of the binding polymer capable of interactions with each other. The functional groups must be such that the groups of one polymer or copolymer interact with that of another in a manner that increases the density of the interactions helping to inhibit the mobility of and/or entrap the pigment particles. The interactions between the functional groups may be polar, dispersive, or of a charge transfer complex nature. The functional groups may be located on the polymer or copolymer backbones or be pendant from the backbones.

For example, a monomer, or mixture of monomers, that form a polymer with a positive charge may be used in conjunction with a monomer or monomers that form a polymer with a negative charge to form the binding polymer. As a more specific example, methacrylic acid ("MAA") and 2-hydroxyethylmethacrylate ("HEMA") may be used to provide a MAA/HEMA copolymer that is then mixed with a HEMA/3-(N, N-dimethyl) propyl acrylamide copolymer to form the binding polymer.

As another example, the binding polymer may be composed of hydrophobically-modified monomers including, without limitation, amides and esters of the formula:

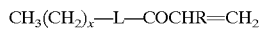

wherein L may be —NH or oxygen, x may be a whole number from 2 to 24, R may be a $C_1$ to $C_6$ alkyl or hydrogen and preferably is methyl or hydrogen. Examples of such amides and esters include, without limitation, lauryl methacrylamide, and hexyl methacrylate. As yet another example, polymers of aliphatic chain extended carbamates and ureas may be used to form the binding polymer.

Preferred binding polymers are a random block copolymer of HEMA, MAA and lauryl methacrylate ("LMA"), a random block copolymer of HEMA and MAA or HEMA and LMA, or a homopolymer of HEMA. The weight percentages, based on the total weight of the binding polymer, of each component in these embodiments is about 93 to about 100 weight percent HEMA, about 0 to about 2 weight percent MAA, and about 0 to about 5 weight percent LMA.

The molecular weight of the binding polymer must be such that it is somewhat soluble in the lens material and the lens material can diffuse into it. However, at the same time, the molecular weight of the binding polymer cannot be so high as to impact the quality of the printed image. Preferably, the molecular weight of the binding polymer is about 7,000 to about 100,000, more preferably about 7,000 to about 40,000, most preferably about 17,000 to about 35,000 $M_{peak}$ which corresponds to the molecular weight of the highest peak in the SEC analyses (=$(M_n \times M_w)^{1/2}$)

For purposes of the invention, the molecular weight is determined using a gel permeation chromatograph with a 90° light scattering and refractive index detectors. Two columns of PW4000 and PW2500, a methanol-water eluent of 75/25 wt/wt adjusted to 50 mM sodium chloride and a mixture of polyethylene glycol and polyethylene oxide molecules with well defined molecular weights ranging from 325,000 to 194 are used.

One ordinarily skilled in the art will recognize that, by using chain transfer agents in the production of the binding polymer, by using large amounts of initiator, by using living polymerization, by selection of appropriate monomer and initiator concentrations, by selection of amounts and types of solvent, or combinations thereof, the desired binding polymer molecular weight may be obtained. Preferably, a chain transfer agent is used in conjunction with an initiator, or more preferably with an initiator and one or more solvents to achieve the desired molecular weight. Alternatively, small amounts of very high molecular weight binding polymer may be used in conjunction with large amounts of solvent to maintain a desired viscosity for the binding polymer. Preferably, the viscosity of the binding polymer will be about 4,000 to about 15,000 centipoise at 23° C.

Chain transfer agents useful in forming the binding polymers have chain transfer constants values of greater than about 0.01, preferably greater than about 7, and more preferably greater than about 25,000. Suitable such chain transfer agents are known and include, without limitation, aliphatic thiols of the formula R—SH wherein R is a $C_1$ to $C_{12}$ aliphatic, a benzyl, a cyclicalipahtic or $CH_3(CH_2)_x$—SH wherein x is 1 to 24, benzene, n-butyl chloride, t-butyl chloride, n-butyl bromide, 2-mercapto ethanol, 1-dodecyl mercaptan, 2-chlorobutane, acetone, acetic acid, chloroform, butyl amine, triethylamine, di-n-butyl sulfide and disulfide, carbon tetrachloride and bromide, and the like, and combinations thereof Generally, about 0 to about 7 weight percent based on the total weight of polymer formulation will be used. Preferably dodecanethiol, decanethiol, octanethiol, or combinations thereof is used as the chain transfer agent.

Any desirable initiators may be used including, without limitation, ultra-violet, visible light, thermal initiators and the like and combinations thereof Preferably, a thermal initiator is used, more preferably 2,2-azobis isobutyronitrile and 2,2-azobis 2-methylbutyronitrile. The amount of initiator used will be about 0.1 to about 5 weight percent based on the total weight of the formulation. Preferably, 2,2-azobis 2-methylbutyronitrile is used with dodecanethiol.

The binding polymers of the invention may be made by any convenient polymerization process including, without limitation, radical chain polymerization, step polymerization, emulsion polymerization, ionic chain polymerization, ring opening, group transfer polymerization, atom transfer polymerization, and the like. Preferably, a thermal-initiated, free-radical polymerization is used. Conditions for carrying out the polymerization are within the knowledge of one ordinarily skilled in the art.

Solvents useful in the production of the binding polymer are medium boiling solvents having boiling points between about 120 and 230° C. Selection of the solvent to be used will be based on the type of binding polymer to be produced and its molecular weight. Suitable solvents include, without limitation, diacetone alcohol, cyclohexanone, isopropyl lactate, 3-methoxy 1-butanol, 1-ethoxy-2-propanol, and the like.

Pigments useful with the binding polymer are those organic or inorganic pigments suitable for use in contact lenses, or combinations of such pigments. The opacity may be controlled by varying the concentration of the pigment and opacifying agent used, with higher amounts yielding greater opacity. Illustrative organic pigments include, without limitation, pthalocyanine blue, pthalocyanine green, carbazole violet, vat orange #1, and the like and combinations thereof Examples of useful inorganic pigments include, without limitation, iron oxide black, iron oxide brown, iron oxide yellow, iron oxide red, titanium dioxide, and the like, and combinations thereof. In addition to these pigments, soluble and non-soluble dyes may be used including, without limitation, dichlorotriazine and vinyl sulfone-based dyes. Useful dyes and pigments are commercially available.

Coating, or wetting, of the pigment particles with binding polymer provides better dispersion of the pigment particles in the bulk binding polymer. The coating may be achieved by use of electrostatic, dispersive, or hydrogen bonding forces to cover the pigment's surface. Preferably, a high shear force is used to disperse the pigment into the binding polymer. The pigment may be added to the binding polymer by dispensing the polymer and pigment into a suitable mixer, such as a rotary shaft mixer and mixing until a homogeneous mixture results, typically for a period of up to about 30 minutes. The mixture may be then fed into a high shear mill, such as an Eiger mill to disperse the pigment into the binding polymer. Repeated milling is carried out as necessary to achieve complete dispersion. Generally, milling is carried out until the pigments are about 0.2 to about 3 microns in size. Milling may be carried out using any suitable, commercially available device including, without limitation, a high shear or ball milling device.

In addition to the pigment and binding polymer, the preferred colorant of the invention contains one or more solvents that aid in coating of the colorant onto a surface. It is desirable, and preferred, that the colorant has a surface tension below about 27 mN/m. This surface tension may be achieved by treatment of the surface, for example a mold surface, to which the colorant will be applied. Surface treatments may be effected by methods known in the art, such as, but not limited to plasma and corona treatments. Alternatively, and preferably, the desired surface tension may be achieved by the choice of solvents used in the colorant.

Thus, the solvents useful in the colorant of the invention are those solvents that are capable of increasing or decreasing the viscosity of the colorant and aiding in controlling the surface tension. Suitable solvents include, without limitation, cyclopentanones, 4-methyl-2-pentanone, 1-methoxy-2-propanol, 1-ethoxy-2-propanol, isopropyl lactate and the like and combinations thereof Preferably, 1-ethoxy-2-propanol and isopropyl lactate are used.

In a preferred embodiment, at least three different solvents are used in the colorant of the invention. The first two of these solvents, both medium boiling point solvents, are used in the production of the binding polymer. Although these solvents may be stripped from the binding polymer after its formation, it is preferred that they are retained. Preferably, the two solvents are 1-ethoxy-2-propanol and isopropyl lactate. An additional low boiling solvent, meaning a solvent the boiling point of which is between about 75 and about 120° C., is used to decrease the viscosity of the colorant as desired. Suitable low boiling solvents include, without limitation, 2-propanol, 1-methoxy-2-propanol, 1-propanol, and the like and combinations thereof Preferably, 1-propanol is used.

The specific amount of solvents used will depend on a number of factors. For example, the amount of solvents used in forming the binding polymer will depend upon the molecular weight of the binding polymer desired and the constituents, such as the monomers and copolymers, used in the binding polymer. The amount of low boiling solvent used will depend upon the viscosity and surface tension desired for the colorant. Further, if the colorant is to be applied to a mold and cured with a lens material, the amount of solvent used will depend upon the lens and mold materials used and whether the mold material has undergone any surface treatment to increase its wettability. Determination of the precise amount of solvent to be used is within the skill of one ordinarily skilled in the art. Generally, the total weight of the solvents used will be about 40 to about 75 weight percent of solvent will be used.

One ordinarily skilled in the art will recognize that each pigment used will have a critical pigment volume for the solvents selected. The critical pigment volume may be determined by any known means and, generally, is a volume based on the efficiency of a solvent and the binding polymer to suspend the pigment particles for example, as disclosed in Patton, Temple C., *Paint Flow and Pigment Dispersion*, 2d ed., pp 126–300 (1993).

In addition to the solvents, a plasticizer may be and, preferably is, added to the colorant to reduce cracking during the drying of the colorant and optical mold parts, to enhance the final quality of the image produced using the colorant, and to enhance the diffusion and swelling of the colorant by the lens material. The type and amount of plasticizer used will depend on the molecular weight of the binding polymer used and, for colorants placed onto molds that are stored prior to use, the shelf-life stability desired. Useful plasticizers include, without limitation, glycerol, propylene glycol, dipropylene glycol, tripropylene glycol, polyethylene glycol 200, 400, or 600, and the like and combinations thereof Preferably, glycerol is used. Amounts of plasticizer used generally will be 0 to about 10 weight percent based on the weight of the colorant.

The opacity of the colorant may be controlled by varying the pigment concentration and the pigment particle size used. Alternatively, an opacifying agent may be used. Suitable opacifying agents, such as for example titanium dioxide or zinc oxide, are commercially available.

In a preferred colorant mixture of the invention, about 0.2 to about 25 weight percent of pigment, about 30 to about 45 weight percent of binding polymer, about 40 to about 70 weight percent of solvents, about 0 to about 25 weight percent of titanium dioxide, and about 0.2 to about 7 weight percent of plasticizer is used. The weight percentages are based on the total weight of the colorant mixture.

The binding polymer may be loaded with about 0.2 to about 25 weight percent based on the weight of the colorant for organic pigments and about 0.2 to about 50 weight percent for inorganic pigments. However, high pigment concentrations may impart a very dark hue. Therefore, preferably about 0.2 to about 7 weight percent of organic pigments and about 0 to about 20 weight percent of inorganic pigments are used. Combinations of pigments may be used in ratios dependent upon the color, shade, and hue desired.

One ordinarily skilled in the art will recognize that additives other than those discussed also may be included in the colorant composition of the invention. Suitable additives include, without limitation, additives that aid flow and leveling, additives for foam prevention, additives for rheology modification, and the like, and combinations thereof.

The colorant of the invention becomes embedded in the lens material upon curing of the material. Thus, the colorant may embed closer to the front or back surface of the lens formed depending on the surface of the mold to which the lens the colorant is applied. Additionally, one or more layers of colorant may be applied in any order. In yet another embodiment, a clear binding polymer layer may be used in conjunction with the colorant. For example, in the method of the invention a clear binding polymer layer may be applied to the molding surface of a mold half prior to application of the colorant. The clear binding polymer may be the same or different from the binding polymer used for the colorant layers. If the clear binding polymer is different from the binding polymer, it must be compatible with the binding polymer and lens material in terms of expansion factor and ability to swell and it must be capable of swelling into the lens material.

The invention may be used to provide tinted hard or soft contact lenses made of any known lens material, or material suitable for manufacturing such lenses. Preferably, the lenses of the invention are soft contact lenses having water contents of about 0 to about 90 percent. More preferably, the lenses are made of monomers containing hydroxy groups, carboxyl groups, or both or be made from silicone-containing polymers, such as siloxanes, hydrogels, silicone hydrogels, and combinations thereof. Material useful for forming the lenses of the invention may be made by reacting blends of macromers, monomers, and combinations thereof along with additives such as polymerization initiators. Suitable materials include, without limitation, silicone hydrogels made from silicone macromers and hydrophilic monomers. Examples of such silicone macromers include, without limitation, polydimethylsiloxane methacrylated with pendant hydrophilic groups as described in U.S. Pat. Nos. 4,259,467; 4,260,725 and 4,261,875; polydimethylsiloxane macromers with polymerizable function described in U.S. Pat. Nos. 4,136,250; 4,153,641; 4,189,546; 4,182,822; 4,343,927; 4,254,248; 4,355,147; 4,276,402; 4,327,203; 4,341,889; 4,486,577; 4,605,712; 4,543,398; 4,661,575; 4,703,097; 4,837,289; 4,954,586; 4,954,587; 5,346,946; 5,358,995; 5,387,632; 5,451,617; 5,486,579; 5,962,548; 5,981,615; 5,981,675; and 6,039,913; and combinations thereof They may also be made using polysiloxane macromers incorporating hydrophilic monomers such as those described in U.S. Pat. Nos. 5,010,141; 5,057,578; 5,314,960; 5,371,147 and 5,336,797; or macromers comprising polydimethylsiloxane blocks and polyether blocks such as those described in U.S. Pat. Nos. 4,871,785 and 5,034,461. All of the cited patents are hereby incorporated in their entireties by reference.

Suitable materials also may be made from combinations of oxyperm and ionoperm components such as is described in U.S. Pat. Nos. 5,760,100; 5,776,999; 5,789,461; 5,807,944; 5,965,631 and 5,958,440. Hydrophilic monomers may be incorporated into such copolymers, including 2-hydroxyethyl methacrylate ("HEMA"), 2-hydroxyethyl acrylate, N,N-dimethylacrylamide ("DMA"), N-vinylpyrrolidone, 2-vinyl-4,4'-dimethyl-2-oxazolin-5-one, methacrylic acid, and 2-hydroxyethyl methacrylamide. Additional siloxane monomers may be incorporated such as tris(trimethylsiloxy)silylpropyl methacrylate, or the siloxane monomers described in U.S. Pat. Nos. 5,998,498; 3,808,178; 4,139,513; 5,070,215; 5,710,302; 5,714,557 and 5,908,906. They may also include various toughening agents, UV blockers, and wetting agents. They can be made using diluents such as primary alcohols, or the secondary or tertiary alcohols described in U.S. Pat. No. 6,020,445. All of the cited patents are hereby incorporated in their entireties by reference.

The materials for making the contact lenses are well known and commercially available. Preferably, the material used is a HEMA based hydrogel, more preferably etafilcon A, and the binding polymer is formed from linear random block copolymers of MAA, HEMA and lauryl methacrylate ("LMA"); linear random block copolymers of MAA and HEMA; linear random block copolymers of HEMA and LMA; or a HEMA homopolymer. Etafilcon A, disclosed in U.S. Pat. Nos. 4,680,336 and 4,495,313 incorporated herein in their entireties by reference, generally is a formulation of 100 parts by weight ("pbw") HEMA, about 1.5 to about 2.5 pbw MAA, approximately 0.3 to about 1.3 pbw ethylene glycol dimethacrylate, about 0.05 to about 1.5 pbw 1,1,1-timethylolpropane trimethacrylate, and about 0.017 to about 0.024 pbw of a visibility tint. Preferably etafilcon A is used with a linear random block copolymer of MAA, HEMA and LMA in a ratio of 0.47 MAA to 100 HEMA to 4.14 LMA, or with a linear random block copolymer of HEMA and MAA in a ratio of 99.9 HEMA and 0.1 MAA to 99.5 HEMA and 0.5 MAA.

A preferred method of manufacturing a tinted lens is carried out using pad printing as follows. A metal plate, preferably made from steel and more preferably from stainless steel, is covered with a photo resist material that is capable of becoming water insoluble once cured. The pattern for the colorant is selected or designed and then reduced to the desired size using any of a number of techniques such as photographic techniques, placed over the metal plate, and the photo resist material is cured. Conditions for carrying out the pattern etching are within the knowledge of one ordinarily skilled in the art.

Following the pattern, the plate is subsequently washed with an aqueous solution and the resulting image is etched into the plate to a suitable depth, for example about 20 microns. The colorant is then deposited onto the pattern to fill the depressions with colorant. A silicon pad of a suitable geometry and varying hardness, generally about 1 to about 10 Shore A durometer units, is pressed against the image on the plate to remove the colorant and the colorant is then dried slightly by evaporation of the solvent. The pad is then pressed against the molding surface of an optical mold and the colorant s allowed to dry. The mold is degassed for a minimum of about 8 hours to remove excess solvents and oxygen after which the mold is filled with lens forming amount of a lens material. A complementary mold half is then used to complete the mold assembly and, after a period of diffusion during which the lens monomer diffuses into the printed image, the mold assembly is exposed to conditions suitable to cure the lens material used.

The invention will be clarified further by consideration of the following, non-limiting example.

EXAMPLE

A colorant composition containing a binding polymer (lauryl methacrylate, 2-hydroxyethyl methacrylate and methacrylic acid), pigments and isopropyl lactate, 1-ethoxy-2-propanol, and 1-propoanol, was pad printed onto the front curve molding surface of a polystyrene optical mold. The mold was degassed for at least 8 hours to remove excess solvents and oxygen after which the mold was filled with a lens-forming amount of etafilcon A. A complementary mold half was then used to complete the mold assembly.

The mold assembly was placed onto a belt that passes through a cure tunnel, the inside of which tunnel was mounted 4 sets of 2, side-by-side, short wave IR lamps at the beginning of the tunnel. In this tunnel, the mold assembly passed under the IR bulbs and was heated to the Tg of the colorant. Control of the intensity of each bulb was maintained by a microprocessor-based temperature controller. The mold assembly then passed into a dark zone in which no bulbs were present, but in which heaters heated the air to between 55 and 75° C. to maintain the mold temperature at or above the colorant Tg. The mold passed through the IR bulb and dark zone of the tunnel at a speed so that it remained in this zone for about 75 seconds during which time the Tg temperature was maintained by a continuous feedback system that monitored the mold temperature. The mold then exited this zone and curing of the lens material was initiated and completed. Once curing was completed, the lens was released from the mold and equilibrated in a buffered saline solution.

What is claimed is:

1. A method for manufacturing a contact lens, comprising the steps of: a.) applying to at least a portion of a molding surface of a mold a tinting-effective amount of a colorant; b.) dispensing a lens-forming amount of a lens material into the mold; c.) heating rapidly the mold to at or above a glass transition temperature of the colorant; d.) diffusing the lens material into the colorant while maintaining the temperature at or above a glass transition temperature of the colorant; and e.) curing subsequently the lens material in the mold under conditions suitable to form the tinted contact lens.

2. The method of claim 1, wherein step c.) is carried out by heating the mold from about room temperature to the glass transition temperature in about 28 seconds.

3. The method of claim 1 or 2, wherein heating of the mold is carried out using a plurality of infra-red lamps.

4. The method of claim 1 or 2, wherein the heating is carried out using hot air.

5. The method of claim 3, wherein step c.) is carried out by heating the mold from about room temperature to the glass transition temperature in about 10 seconds.

6. The method of claim 1, wherein step d.) is carried out for a time sufficient to swell the colorant to about 1 to about 4 times a thickness of the colorant when it is dry.

7. The method of claim 1, wherein step d.) is carried out for about 45 to about 75 seconds.

8. The method of claim 1, wherein step e.) is carried out using a visible light cure is used at room air at a temperature of about 55 to about 70° C. for about 75 to about 150 seconds.

9. A method for manufacturing a contact lens, comprising the steps of: a.) applying to at least a portion of a molding surface of a mold a tinting-effective amount of a colorant; b.) dispensing a lens-forming amount of a lens material into the mold; c.) heating the mold using a plurality of infra-red lamps to at or above a glass transition temperature of the colorant in about 10 seconds; d.) diffusing the lens material into the colorant while maintaining the temperature at or above a glass transition temperature of the colorant and for a time sufficient to swell the colorant to about 1 to about 4 times a thickness of the colorant when it is dry; and e.) curing subsequently the lens material in the mold under conditions suitable to form the tinted contact lens.

10. The method of claim 9, wherein step e.) is carried out using a visible light cure is used at room air at a temperature of about 55 to about 70° C. for about 75 to about 150 seconds.

11. A method for manufacturing a contact lens, comprising the steps of: a.) applying to at least a portion of a molding surface of a mold a tinting-effective amount of a colorant; b.) dispensing a lens-forming amount of a lens material into the mold; c.) heating the mold using hot air to a temperature at or above a glass transition temperature of the colorant in about 10 seconds; d.) diffusing the lens material into the colorant while maintaining the temperature at or above a glass transition temperature of the colorant and for a time sufficient to swell the colorant to about 1 to about 4 times a thickness of the colorant when it is dry; and e.) curing subsequently the lens material in the mold under conditions suitable to form the tinted contact lens.

12. The method of claim 11, wherein step e.) is carried out using a visible light cure is used at room air at a temperature of about 55 to about 70° C. for about 75 to about 150 seconds.

13. A method for manufacturing a contact lens, comprising the steps of: a.) applying to at least a portion of a molding surface of a mold a tinting-effective amount of a colorant, the colorant comprising one or more pigments, one or more solvents and a binding polymer; b.) dispensing a lens-forming amount of a lens material into the mold; c.) heating rapidly the mold to at or above a glass transition temperature of the colorant; d.) diffusing the lens material into the colorant while maintaining the temperature at or above a glass transition temperature of the colorant; and e.) curing subsequently the lens material in the mold under conditions suitable to form the tinted contact lens, wherein the binding polymer and the lens material form an interpenetrating polymer network.

14. The method of claim 13, wherein step c.) is carried out by heating the mold from about room temperature to the glass transition temperature in about 28 seconds.

15. The method of claim 13 or 14, wherein heating of the mold is carried out using a plurality of infra-red lamps.

16. The method of claim 13 or 14, wherein the heating is carried out using hot air.

17. The method of claim 15, wherein step c.) is carried out by heating the mold from about room temperature to the glass transition temperature in about 10 seconds.

18. The method of claim 13, wherein step d.) is carried out for a time sufficient to swell the colorant to about 1 to about 4 times a thickness of the colorant when it is dry.

19. The method of claim 13, wherein step d.) is carried out for about 45 to about 75 seconds.

20. The method of claim 13, wherein step e.) is carried out using a visible light cure is used at room air at a temperature of about 55 to about 70° C. for about 75 to about 150 seconds.

21. A method for manufacturing a contact lens, comprising the steps of: a.) applying to at least a portion of a molding surface of a mold a tinting-effective amount of a colorant, the colorant comprising one or more pigments, one or more solvents and a binding polymer; b.) dispensing a lens-forming amount of a lens material into the mold; c.) heating the mold using a plurality of infra-red lamps to at or above a glass transition temperature of the colorant in about 10 seconds; d.) diffusing the lens material into the colorant while maintaining the temperature at or above a glass transition temperature of the colorant and for a time sufficient to swell the colorant to about 1 to about 4 times a thickness of the colorant when it is dry; and e.) curing subsequently the lens material in the mold under conditions suitable to form the contact lens, wherein the binding polymer and the lens material form an interpenetrating polymer network.

22. The method of claim 21, wherein step e.) is carried out using a visible light cure is used at room air at a temperature of about 55 to about 70° C. for about 75 to about 150 seconds.

23. A method for manufacturing a contact lens, comprising the steps of: a.) applying to at least a portion of a molding surface of a mold a tinting-effective amount of a colorant, the colorant comprising one or more pigments, one or more solvents and a binding polymer; b.) dispensing a lens-forming amount of a lens material into the mold; c.) heating the mold using hot air to at or above a glass transition temperature of the colorant in about 10 seconds; d.) diffusing the lens material into the colorant while maintaining the temperature at or above a glass transition temperature of the colorant and for a time sufficient to swell the colorant to about 1 to about 4 times a thickness of the colorant when it is dry.; and e.) curing subsequently the lens material in the mold under conditions suitable to form the contact lens, wherein the binding polymer and the lens material form an interpenetrating polymer network.

24. The method of claim 23, wherein step e.) is carried out using a visible light cure is used at room air at a temperature of about 55 to about 70° C. for about 75 to about 150 seconds.

* * * * *